United States Patent [19]

Sczomak et al.

[11] Patent Number: 5,377,651
[45] Date of Patent: Jan. 3, 1995

[54] CLOSED-LOOP CONTROL OF A DIESEL ENGINE

[75] Inventors: David P. Sczomak, Troy; Richard A. Peden, Livonia, both of Mich.

[73] Assignee: General Motors Corporation, Detroit, Mich.

[21] Appl. No.: 172,977

[22] Filed: Dec. 27, 1993

[51] Int. Cl.$^6$ ............................................. F02M 25/07
[52] U.S. Cl. .................................... 123/569; 123/571
[58] Field of Search ............................... 123/569, 571

[56] References Cited

U.S. PATENT DOCUMENTS

| | | | |
|---|---|---|---|
| 4,448,178 | 5/1984 | Yamato et al. | 123/571 |
| 4,462,378 | 7/1984 | Atago et al. | 123/571 |
| 4,624,229 | 11/1986 | Matekunas | 123/571 |
| 4,640,257 | 2/1987 | Kodama et al. | 123/698 |
| 4,715,348 | 12/1987 | Kobayashi et al. | 123/571 |
| 5,150,694 | 9/1992 | Currie et al. | 123/569 |
| 5,150,696 | 9/1992 | Kabasin et al. | 123/571 |
| 5,205,260 | 4/1993 | Takahashi et al. | 123/571 |
| 5,209,214 | 5/1993 | Ikuta et al. | 123/571 |
| 5,273,019 | 12/1993 | Matthews et al. | 123/571 |

*Primary Examiner*—David A. Okonsky
*Attorney, Agent, or Firm*—Michael J. Bridges

[57] ABSTRACT

Closed-loop control of the quantity of diesel engine exhaust gas that is recirculated to an air intake of the engine responds to a degree of deviation of a sensed air inlet rate away from a desired air inlet rate. A series of dedicated adaptive correction values are selectively updated and stored in memory in response to the degree of deviation for corresponding engine operating ranges. Proportional and integral correction for air inlet rate deviations is thereby provided to an otherwise open-loop desired EGR quantity.

7 Claims, 5 Drawing Sheets

CLOSED-LOOP CONTROL OF A DIESEL ENGINE

FIELD OF THE INVENTION

This invention relates to closed-loop engine control and, more particularly, to closed-loop control of the rate at which engine exhaust gas is recirculated to an engine air intake.

BACKGROUND OF THE INVENTION

Recirculation of a controlled amount of diesel engine exhaust gas to the engine air intake is generally known to provide a beneficial reduction in diesel engine emissions of oxides of nitrogen NOx. Limits are conventionally imposed on the amount of recirculated exhaust gas EGR to avoid excessive engine intake air charge dilution which may degrade engine performance and increase particulate emission levels.

Both open-loop and closed-loop EGR control approaches operate to deliver EGR to the engine air intake in an amount reflecting a compromise between the competing goals of minimizing NOx and particulate emissions in an engine that delivers a satisfying level of performance. The open-loop approaches deliver EGR according to an open-loop EGR schedule determined through a modelled or calibrated relationship between desired EGR and certain engine parameters. Such open-loop approaches are sensitive to variations in that modelled or calibrated relationship, such as may result from sensor or actuator degradation over time, or from gradual changes in such parameters as engine exhaust backpressure.

Closed-loop approaches attempt to compensate for unmodelled or unmodellable system disturbances by including some measure of the actual performance of the EGR control in the determination of a desired EGR quantity. For example, the approach described in U.S. Pat. No. 5,150,694, assigned to the assignee of this invention, relies on actual engine air/fuel ratio feedback from a conventional oxygen sensor in the diesel engine exhaust gas path to compensate for deviations in the actual performance of the EGR control away from a desired performance. Sensitivity to unmodelled system disturbances is reduced through such closed-loop operation, but at a cost. The oxygen sensors and their supporting electronic circuitry add significant expense to the EGR control. Additionally, sensor contamination and sensor exposure to temperature extremes in the harsh exhaust gas path environment can lead to reduced sensor accuracy, which can result in reduced EGR control precision.

Accordingly, it would be desirable to realize EGR control sensitivity reductions through a closed-loop EGR control approach that does not add significant cost to the control system. Further, it would be desirable to rely on feedback from sensors not subject to the harsh environment of the engine exhaust gas path, so that control precision loss resulting from sensor contamination and sensor exposure to temperature extremes may be reduced.

SUMMARY OF THE INVENTION

The present invention provides the desirable improvements in closed-loop EGR control by relying on a feedback signal already present in many engine control systems and generated by a sensor not exposed to temperature extremes or to significant contaminant levels.

The present invention provides closed-loop EGR control responsive to a sensed engine mass airflow MAF value. MAF is currently a sensed parameter on many conventional engine control systems. MAF is commonly generated through a sensor in the inlet air path to the engine at a point after the inlet air has been filtered by an air filter. Accordingly, the MAF sensor is exposed to a minimal level of contaminants. Further, the MAF sensor is commonly spaced a considerable distance away from high temperature components, reducing potential sensor wear due to temperature.

Specifically, fuel-lead engine control on a diesel engine periodically senses an operator requested engine operating point from which a desired fuel quantity for an engine cylinder is generated. A target engine cylinder air inlet rate is determined and provided for by estimating an open-loop desired EGR quantity responsive to the desired fuel quantity to dilute the fresh air charge to the cylinder sufficiently to drive actual air inlet rate toward the target air inlet rate.

According to this invention, this EGR estimation loop is closed by determining and applying an EGR correction term responsive to sensed mass airflow into the engine cylinder. An air inlet rate error term is calculated as the difference between sensed air inlet rate into a cylinder and the target air inlet rate. The EGR correction term may then be determined from the air inlet rate error term and the estimated open-loop desired EGR quantity.

In a further aspect of this invention, a plurality of EGR correction terms correspond to a plurality of engine operating ranges. An EGR correction term corresponding to a sensed engine operating level is activated and applied in the closed-loop desired EGR command determination. Under stable engine operating conditions, the activated correction term may be updated in response to deviations away from the desired mass airflow and restored for later use.

The correction term update rate may be relatively slow compared to the rate at which such correction terms are applied. For example, prior to each update, a sustained period of stable engine operation may be required, such as operation at a relatively steady engine operating level. Such a requirement of stable engine operation reduces the potential that noise may infect any one correction term, yet still may support sufficiently responsive compensation for the type of disturbances targeted thereby. For example, slowly degrading parameters such as exhaust gas backpressure and any slow degradation in accuracy and performance of engine control sensors and actuators can be slowly yet effectively compensated.

Through application of the present invention, unmodelled or unmodellable control disturbances tending to drive actual EGR away from a desired EGR are compensated at a reduced cost, using sensed parameter information substantially insulated against the effects of exposure to contaminants and high temperatures.

BRIEF DESCRIPTION OF THE DRAWINGS

The invention may be best understood by reference to the following preferred embodiment and the drawings in which.

DESCRIPTION OF THE PREFERRED EMBODIMENT

Figure 1:
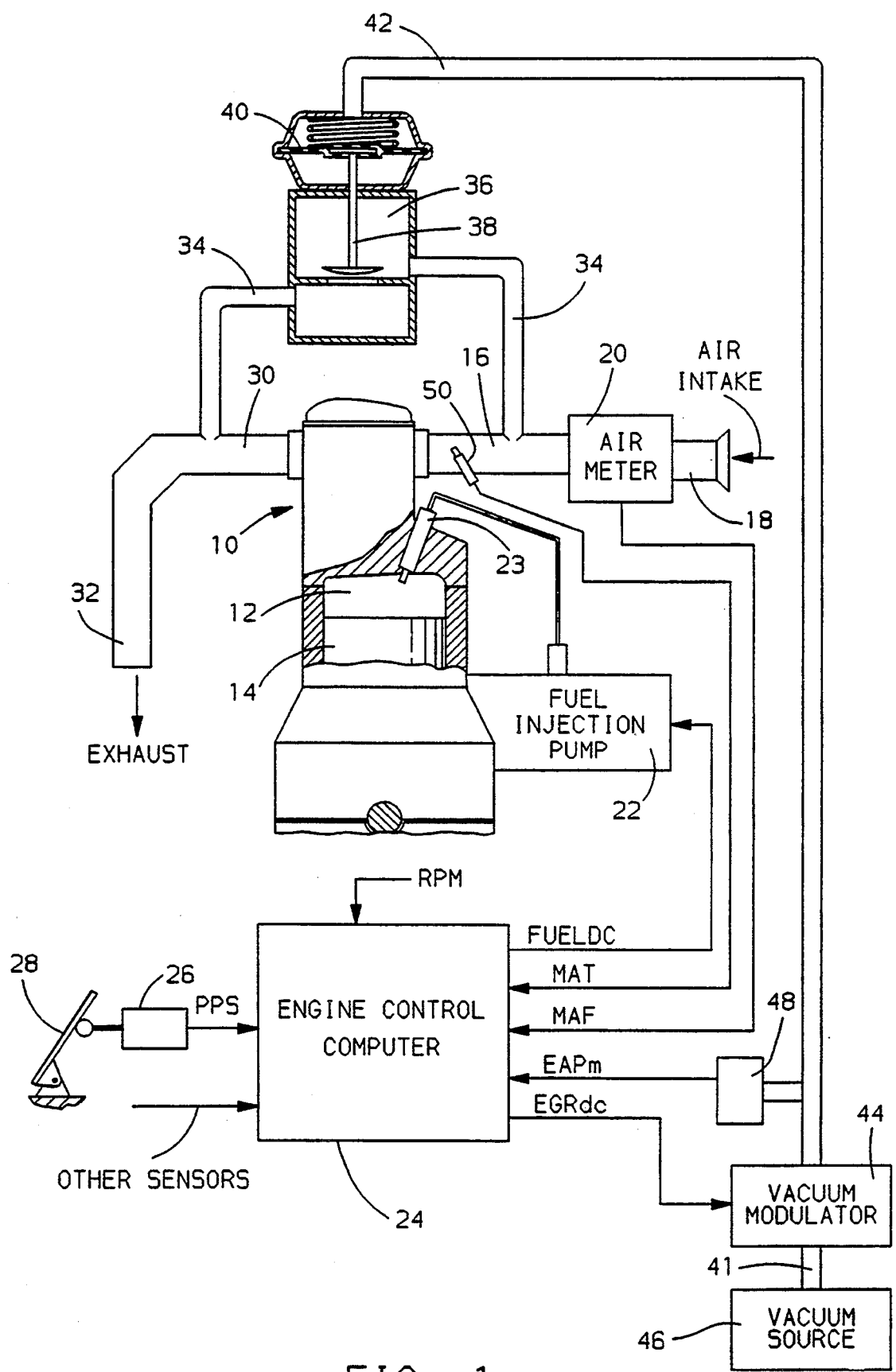
FIG. 1 is a general diagram of the engine control hardware used in accord with a preferred embodiment of this invention.

Referring to FIG. 1, a single cylinder of a diesel engine 10 is shown for illustrative purposes only, it being understood that the engine 10 may have any number of other cylinders as desired. The cylinder illustrated includes a combustion space 12, and piston 14. Air is drawn into the combustion space 12 during engine operation from an intake manifold 16 that is open to the atmosphere via air intake conduit 18. The conduit 18 is unthrottled so that the pressure in the intake manifold 16 is substantially atmospheric pressure.

The conduit 18 includes a conventional air meter 20, such as of the hot wire type or of the Bosch vane type air meters, for providing a measure of the mass airflow into the engine 10. Air meter 20 provides an output signal MAF indicative of the mass airflow into the engine 10. Air meter 20 is of the commercially available hot wire type in the preferred embodiment, due to its relatively low restriction of intake air flow through conduit 18, and due to its improved transient response over the generally known vane type air meter.

Fuel is metered into the engine cylinders through the operation of a solenoid-controlled fuel pump 22 that delivers fuel pulses timed to engine rotation events to fuel injectors, such as injector 23 which delivers fuel to combustion space 12. The pump 22 is controlled by engine control computer 24 to meter appropriate amounts of fuel to the engine cylinders with each fuel injection event, such as determined from the timing of the engine rotation events. Generally, the vehicle operator dictates the appropriate amounts of fuel to be metered by positioning an accelerator pedal 28, the position of which is transduced by pedal position sensor 26, which may be a potentiometric position sensor providing an output signal PPS indicative of pedal 28 displacement away from a rest position to computer 24. The computer generates a fuel command FUELDC responsive to the input signal PPS, and provides FUELDC to the pump 22. For example, FUELDC may be a timed fuel pulse wherein the pump 22 meters fuel to the next active cylinder for the duration of the pulse.

Exhaust gas produced through engine cylinder combustion events is discharged into exhaust manifold 30 and thereafter is passed through exhaust gas conduit 32. EGR conduit 34 is provided as a path through which a controlled portion of the exhaust gas is recirculated to the engine intake manifold 16, to reduce levels of NOx discharged from the engine 10, and to provide control authority over the inlet air quantity through inlet air charge dilution. An EGR passage 36 in the EGR conduit 34 contains an EGR valve 38 actuated by vacuum pressure in vacuum actuator 40 to control a degree of the valve opening. Authority over the EGR valve is thus provided by the degree of vacuum applied to the vacuum actuator 40 from vacuum line 42. A vacuum source 46, such as a conventional vacuum pump applies a substantially steady vacuum to vacuum line 41 when power is applied to the pump, such as when the engine 10 is operating.

A vacuum modulator 44 is disposed in the vacuum line 42 between the vacuum actuator 40 and the vacuum source 46. The vacuum modulator 44 includes an electrically-controlled solenoid valve (not shown) which opens and closes at a duty cycle dictated by control signal EGRdc supplied to the vacuum modulator 44 from computer 24. For example, EGRdc may be a fixed frequency, fixed amplitude, variable duty cycle electrical signal.

An absolute pressure sensor 48 is exposed to the pressure in the vacuum line between the vacuum modulator 44 and the vacuum actuator 40 to transduce absolute pressure in the line 42 and output an EGR absolute pressure signal EAPm indicative of that absolute pressure to the computer 24. A signal RPM the period of which is proportional to the rate of rotation of an engine output shaft (not shown) is provided to computer 24 and may be generated by a conventional hall effect sensor (not shown) positioned to sense passage of the teeth of a toothed wheel (not shown) that rotates with the engine output shaft. Other input signals generally recognized in conventional engine control may be provided to the computer 24, such as engine coolant temperature, output from a conventional thermocouple in the engine coolant path (not shown), engine intake manifold air temperature MAT output from a conventional thermocouple (not shown) in the intake manifold 16 and barometric pressure, such as output from a conventional barometric pressure sensor (not shown).

The engine control computer 24 may take the form of a standard digital computer, such as a Motorola model MC68HC11 single chip microcomputer, containing such generally-known components as a central processing unit, and both volatile and non-volatile memory. The computer periodically reads and processes inputs from engine sensors, such as the described MAF, EAPm, PPS, and RPM inputs, and, through execution of control routines stored in computer non-volatile memory, generates and outputs a series of actuator commands such as the described FUELDC and EGRDC commands.

The FUELDC command may be generated in an event-based interrupt service routine, which for example, is executed upon the occurrence of each cylinder event. FUELDC is the duty cycle corresponding to a commanded fuel quantity FUEL generated through execution of the cylinder event based service routine. Generally, in the fuel-lead control of the present embodiment, FUEL is a predetermined function of engine speed as indicated by the frequency of the input signal RPM and of the degree of displacement of the pedal 28 away from a rest position as indicated by signal PPS. FUEL additionally may be adjusted as a function of conventional parameters such as engine temperature, etc, in accord with generally known engine fuel control practice.

Figure 2A:
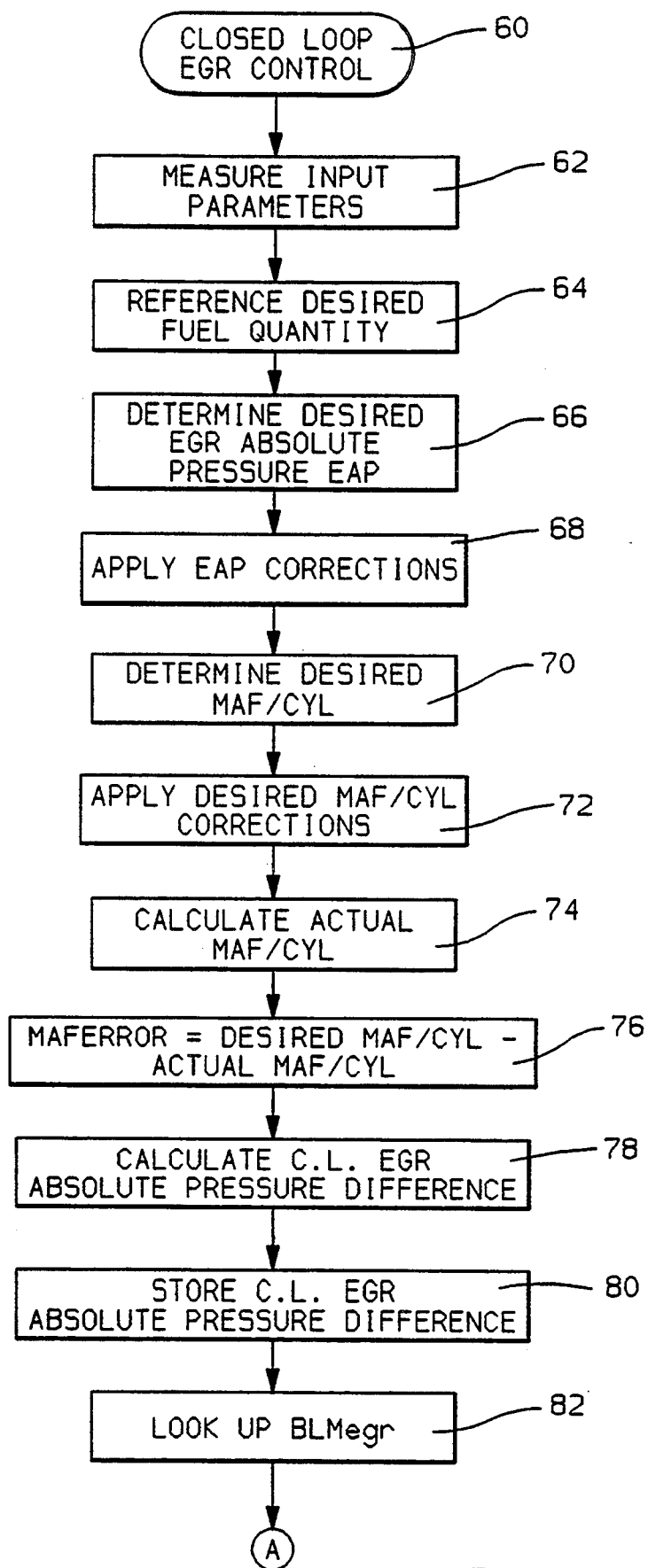
FIGS. 2a and 2b are computer flow diagrams illustrating steps used to carry out this invention in accord with the hardware of FIG. 1.
Figure 2B:
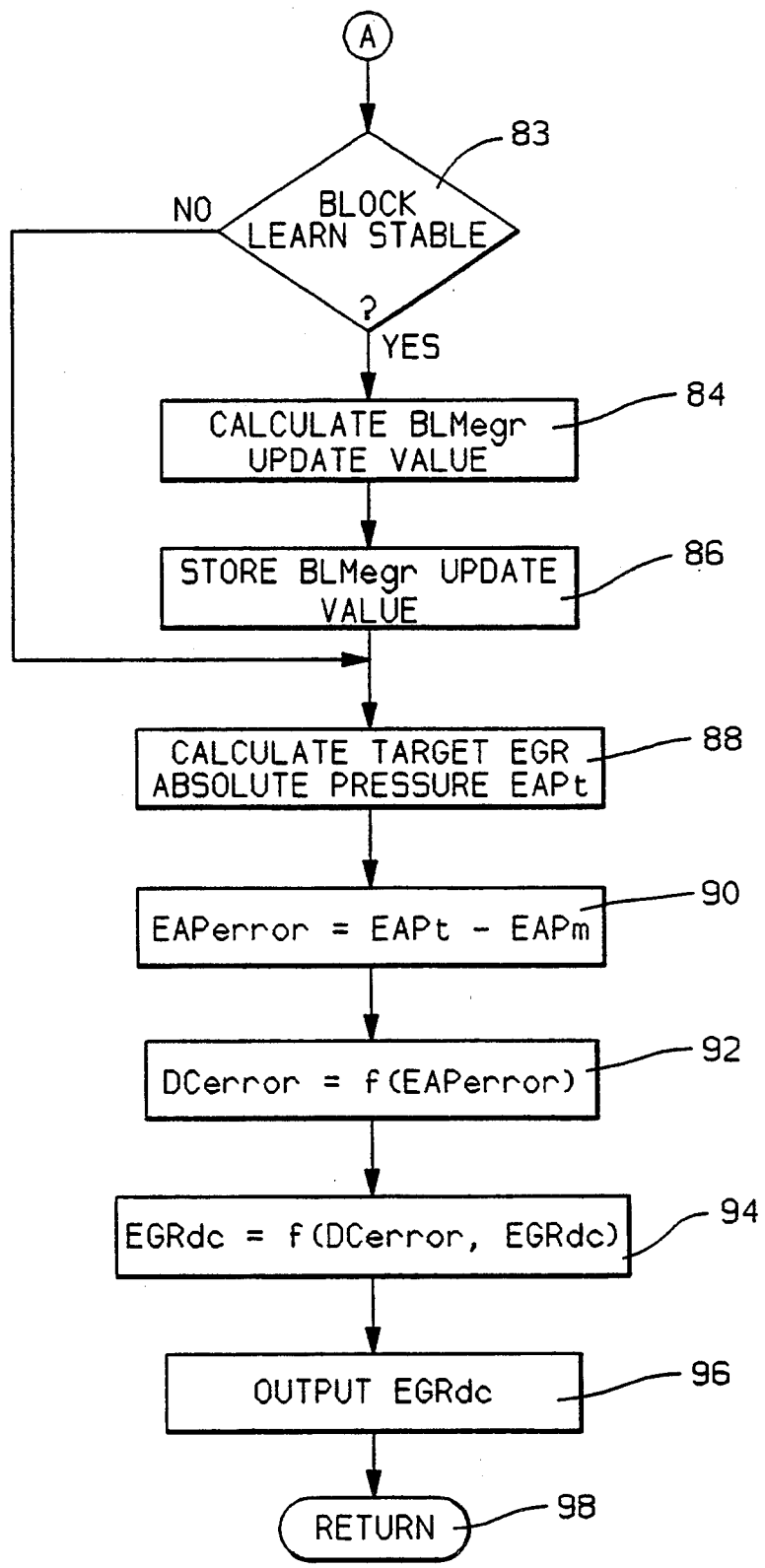

The EGRDC command is generated in this embodiment according to the routine of FIGS. 2a and 2b which may be periodically executed while the computer is operating, such as while the vehicle operator has provided ignition power to the computer 24 by rotating the vehicle ignition switch (not shown) to its "on" position.

The individual steps of the routine of FIGS. 2a and 2b (and of FIG. 4) of this embodiment may be stored as a sequence of computer instructions to be periodically executed, such as on the occurrence of a time-based engine control interrupt. For example, the time-based interrupt may occur approximately every 6.25 milliseconds while the engine control computer 24 is operating. Upon occurrence of a predetermined number of such interrupts, such as upon every fifth of such interrupts in the present embodiment, the computer 24 vectors control to a step 60 of the routine of FIGS. 2a and 2b, and then moves to a step 62 to measure input parameters, such as by reading the described input signals MAF, EAPm, PPS, and RPM. Additionally, barometric pressure and engine coolant temperature may be read at the step 62.

The routine then proceeds to a step 64 to reference the value of the fuel command FUEL from engine control computer 24 (FIG. 1) memory, as was generated in the most recent execution of the cylinder event driven service routine. The routine advances next to a step 66 at which a desired EGR absolute pressure EAP is determined on an open-loop basis as a predetermined function of the referenced FUEL value and of the engine speed indicated by signal RPM, to provide a desirable open-loop engine air/fuel ratio.

For example, EAP may be referenced from a conventional lookup table in non-volatile computer memory as the EAP value corresponding to FUEL and RPM. The EAP entries in the table may be determined through a calibration of the engine 10 (FIG.1) as the EGR absolute pressure providing a desirable level of engine performance and emissions. The EAP entries may reflect a balancing between the generally known competing goals of NOx reduction on one hand and engine performance and particulate emissions reduction on the other. In this embodiment, EAP corresponds to the pressure desired to be present in the vacuum line 42 (FIG. 1) through action of the vacuum modulator 44 to drive the EGR valve 38 to a position corresponding to a desired degree of restriction in the EGR conduit 34. The open loop EAP value determined at the step 66 is corrected using a closed-loop correction value from a mass airflow measurement, as will be described.

After the step 66, the routine moves to a step 68 to correct EAP for the generally understood effects of changes in barometric pressure, engine coolant temperature, etc. on desired EGR absolute pressure. Such effects may be calibrated for a given control application in accord with engine performance and emissions goals.

Next, the routine moves to a step 70, to determine a desired mass airflow per cylinder DESIRED MAF/CYL value as a predetermined function of FUEL and engine speed as indicated by RPM. For example, DESIRED MAF/CYL may be referenced from a conventional lookup table as a DESIRED MAF/CYL corresponding to FUEL and RPM calibrated to provide a desirable engine air/fuel ratio. Next at step 72, corrections to DESIRED MAF/CYL, such as described at step 68 to account for generally understood effects of changes in barometric pressure and engine intake manifold air temperature MAT on engine air/fuel ratio are applied, after which the routine moves to a step 74, to calculate actual mass airflow per cylinder, such as by dividing input signal MAF by engine speed as determined from input signal RPM.

The routine next generates mass airflow error MAFERROR at a step 76, by subtracting actual mass airflow per cylinder from DESIRED MAF/CYL. A closed-loop EGR absolute pressure difference value CLEAPD is then calculated at a step 78 as follows $$CLEAPD = Kp * MAFERROR$$

in which Kp is a predetermined proportional gain determined through a conventional calibration in accord with a desired degree of responsiveness of the closed-loop correction of the present embodiment to mass airflow variations away from expected mass airflow.

CLEAPD is then stored at a step 80 in computer memory for later use. Next, at a step 82, an active EGR block learn value BLMegr is referenced from a series of EGR block learn values as the block learn value corresponding to the present engine operating level, such as may be indicated by the present engine speed and the referenced fuel quantity FUEL. Each of the series of EGR block learn values corresponds to a portion of the engine operating range over which EGR control is active.

The EGR block learn values may be thought of as arranged in a two-dimensional table in non-volatile memory of computer 24 (FIG. 1), in which a first table dimension corresponds to a first engine parameter, such as FUEL, and a second table dimension corresponds to a second engine parameter, such as RPM. Thus for a given FUEL-RPM pair, a single table entry is active, and may be updated under certain conditions through the present routine, applied in the open-loop EGR correction, and restored for later use.

Specifically, after referencing the active BLMegr value at the step 82, the routine moves to a step 83, to determine whether the block learn is "stable." The block learn is stable if it is not rapidly switching between active BLMegr values. For example, in this embodiment, the block learn is stable when the currently active BLMegr value in the block learn table has been active for at least a predetermined time, such as fifty milliseconds. If the block learn is determined to be stable at the step 83, then the active block learn value is updated at a step 84 and restored in the block learn table at a step 86. However, if the block learn is not stable at the step 83, such updating is not carried out by avoiding the steps 84 and 86 and moving directly to a step 88. This selective updating of the block learn table improves the precision of the block learn values, yet reduces learning responsiveness. The routine waits for transient conditions to significantly die out before updating to reduce the negative effect of such conditions on the accuracy of the block learn update value calculation. The length of the wait is minimized however, so that the routine still is able to respond adequately to the effects of the control disturbances that gradually tend to drive actual EGR away from desired EGR.

Returning to the step 83, if the block learn is stable, the routine moves to a step 84, to calculate a BLMegr update value as follows $$BLMegr = BLMegr + Ki * (CLEAPD/EAP)$$

in which EAP is the corrected EAP described at step 68, and Ki is a predetermined integrator gain, such as may be determined in a conventional calibration process to provide tolerable control response, such as to provide reasonable steady state mass airflow error. For example, a typical range for the Ki of this embodiment extends from about zero to about one.

After updating BLMegr according to the integrator function of step 84, the updated BLMegr value is stored back in computer non-volatile memory at a step 86, such as back in the location from which it was referenced at the described step 82. Next, or if the block learn is not stable at the step 83, the routine moves to a step 88 to calculate a target EGR absolute pressure EAPt as a correction to the open-loop desired EAP as follows $$EAPt = (EAP*BLMegr) + CLEAPD.$$

In this manner, information from mass airflow meter 20 (FIG. 1), which is commonly already present for other control functions, is used to close the loop on EGR control, so that unmodelled control disturbances not compensable through known open-loop approaches may be compensated at no significant additional cost and with a reduced risk of control degradation when compared to known closed-loop approaches.

Furthermore, through proper selection of the proportional and integral gains Kp and Ki respectively, and through the application thereof in the determination of EAPt as provided in this embodiment at step 88, a slow corrective action for control perturbations may be provided so as to reduce the sensitivity of the correction to transient conditions. Furthermore, the use of the block learn values provides that the slow corrective action may vary with any of a wide variety of engine parameters, including but not limited to the parameters of FUEL and RPM of this embodiment.

Returning to FIG. 2b, after determining EAPt at step 88, the routine calculates an EGR absolute pressure error value EAPerror at a step 90 as the difference between EAPt and EAPm.

The routine then generates a duty cycle error DCerror as the degree of change in EGR duty cycle command EGRdc necessary to drive EAPerror toward zero in a controlled manner, such as according to well-known classical or modern control techniques for rapidly driving EAPerror toward zero with minimum overshoot and minimum steady state error. The value DCerror is next at a step 94, applied along with the previous EGRdc value to generate a new EGRdc value. For example, the new EGRdc value may simply be the sum of DCerror and EGRdc.

The routine next moves to a step 96 to output EGRdc to vacuum modulator 44 (FIG. 1) to allow control of the valve therein, as described. The routine then moves to a step 98, and from there is directed to execute other computer operations, such as operations to carry out generally-known engine control, diagnostic, or maintenance functions.

Figure 3:
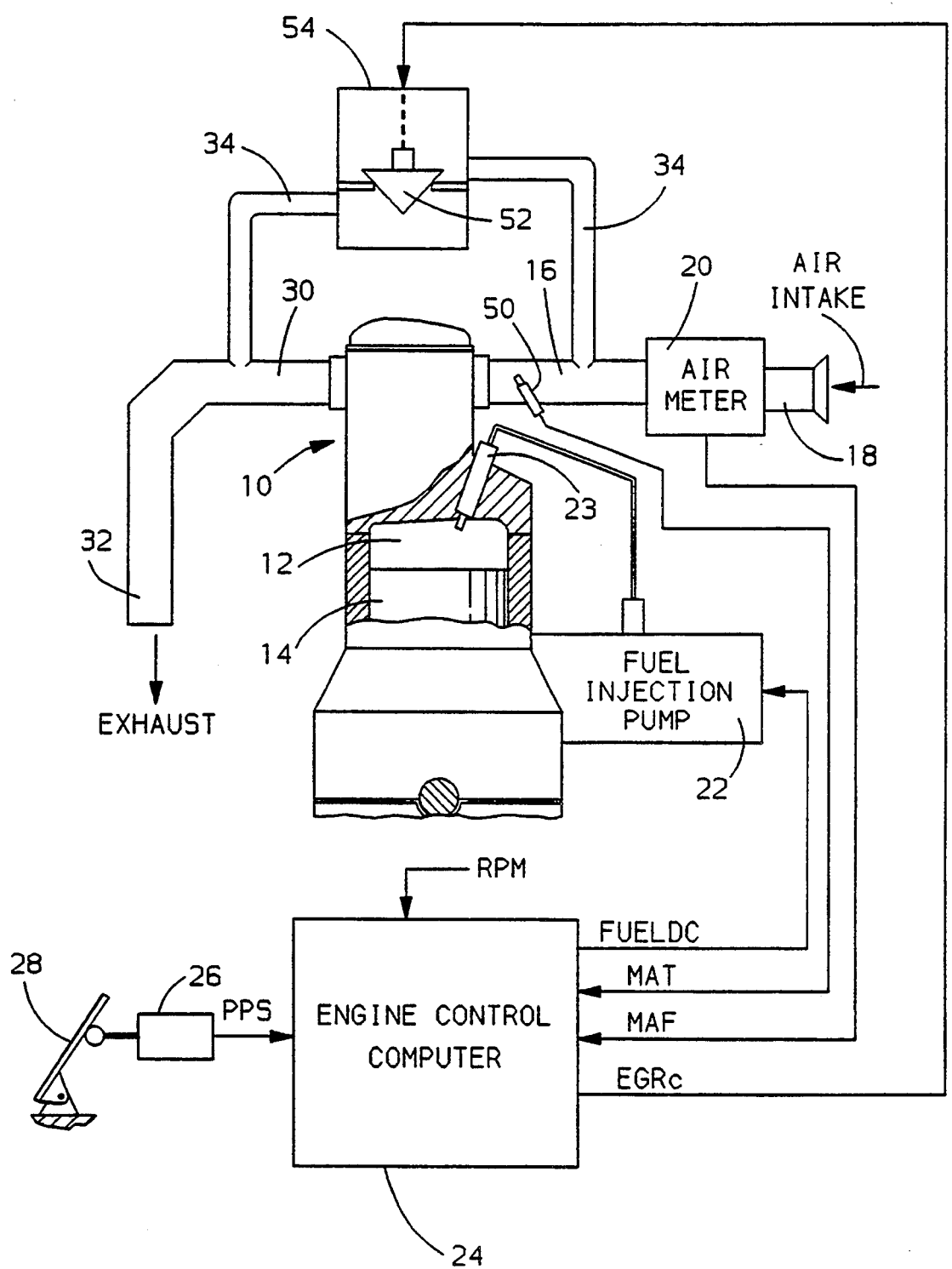
FIG. 3 is a general diagram of engine control hardware used in accord with an alternative embodiment of this invention.

FIG. 3 illustrates an alternative embodiment in accord with this invention in which an electrically-controlled EGR valve 54, such as a linear EGR valve, operates to control the degree of restriction of EGR conduit 34, for example through control of a position of a pintle 52 in a passage in EGR conduit 34. The EGR valve 54 ms responsive to an electrical command EGRc directly from computer 24, and may not rely on the vacuum apparatus of the previously described embodiment hereof.

Computer 24 may operate to vary the magnitude of EGRc wherein the position of the pintle in valve 54 may vary in proportion to the magnitude of EGRc, thereby varying the degree of restrictiveness in EGR conduit 34. The electrically-controlled EGR valve 54 must be sized to deliver sufficient EGR to provide for worst case air inlet rate reduction to the engine 10 (FIG. 1), and must be capable of sufficiently high resolution control of EGR that engine air/fuel ratio may be closely maintained around a desired air/fuel ratio. The electrically-controlled EGR valve 50 of the alternative embodiment may be applied in the hardware of FIG. 1 hereof, after eliminating vacuum source 46, vacuum modulator 44, pressure sensor 48, vacuum line 42, vacuum actuator 40, and valve 38 from FIG. 1. There is a generally understood controllability advantage in supplanting the vacuum hardware associated with the EGR valve of the previously described embodiment with the highly controllable electrically-controlled EGR valve 54 of the alternative embodiment. The cost savings in eliminating such vacuum hardware may mitigate any additional expense associated with the electrically-controlled valve 54.

Figure 4:
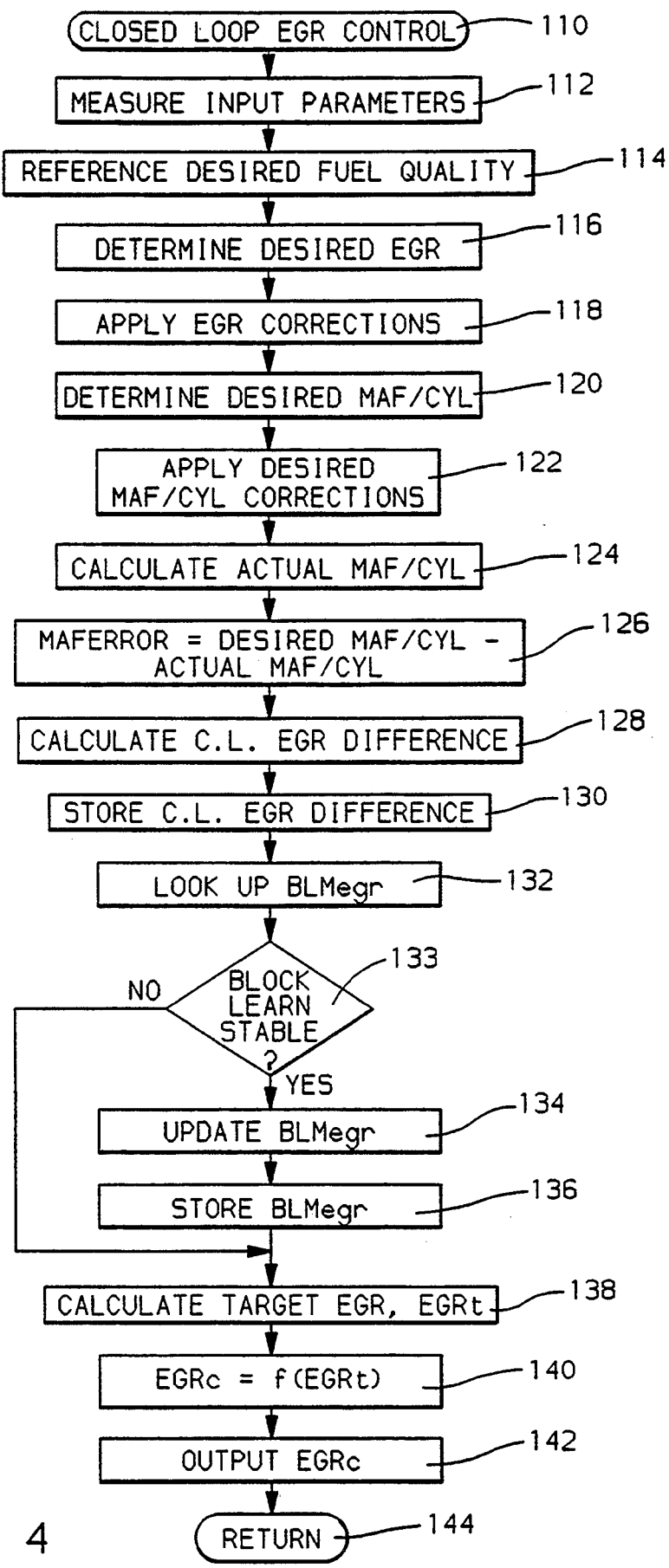
FIG. 4 illustrates steps of a computer flow diagram in accord with the alternative embodiment and the hardware of FIG. 3.

The routine of FIG. 4 illustrates a series of operations that may be used to control the hardware of FIG. 3, such as through step-by-step execution of the operations described therein by computer 24. Specifically, the routine starts at a step 110 of FIG. 4, moves to measure input parameters at a step 112, and to reference the fuel quantity FUEL at a step 114, wherein such steps may be carried out as described in the FIGS. 2a and 2b. Next, an open-loop desired EGR quantity is determined at a step 116 as a predetermined function of the quantity FUEL and of engine speed, as indicated by signal RPM, as the quantity of EGR calibrated for the FUEL and RPM values to provide a desired engine air/fuel ratio. The EGR value is the absolute quantity of EGR to be metered to the intake manifold 16 (FIG. 3), and may be calibrated and stored in a conventional lookup table generally in the manner described for step 66 of FIG. 2a.

The series of steps carried out next, including steps 118–126 may be as described for the corresponding steps 68–76 of FIG. 2a. After such steps, the routine of FIG. 4 calculates a closed-loop EGR difference value CLEGRD as follows $$CLEGRD = Kp*MAFERROR$$

in which Kp is a proportional gain selected as described in the previous embodiment. The routine then stores CLEGRD at a step 130, and moves to a step 132 at which an EGR block learn value BLMegr is referenced from a conventional block learn table, such as that described in the previous embodiment at step 82 of FIG. 2a. The entries in the block learn table correspond to actual EGR commands and not the pressure commands of the previous embodiment, yet otherwise may be calibrated and referenced from the table generally as described for the table of the previous embodiment.

Once the BLMegr value is referenced from the table at the step 132, and, as described in step 83 of FIG. 2b, if the block learn is stable at a step 133, the active block learn value is updated at a step 134 as follows $$BLMegr = BLMegr + Ki*(CLEGRD/EGR)$$

in which Ki is an integrator gain selected as described in the previous embodiment. After updating BLMegr at the step 134, it is stored at a step 136. Next, or if the block learn was determined to not be stable at the step 133, the routine moves to a step 138 to apply the active block learn value BLMegr in a determination of a target EGR value called EGRt as follows $$EGRt = (EGR*BLMegr) + CLEGRD.$$

Such is provided to incorporate mass airflow information into the EGR command determination for disturbance compensation, as described in the previous embodiment at step 88 of FIG. 2b.

A commanded EGR value EGRc is generated next at a step 140 as the valve command needed to position the EGR valve 50 to pass the target EGR quantity EGRt into the intake manifold 16 (FIG. 3). The relationship between EGRc and EGRt may be calibrated for a given system and stored in a conventional lookup table as a series of paired EGRc and EGRt values, in accord with generally-known practice in the art. The referenced EGRc value is then output at a step 142 in the form of an electrical command the magnitude of which may control the degree of opening of the valve 50 (FIG. 3), as described. Step 144 is then executed to return to any previous operations that may have been executing prior to the start of the present iteration of the routine of FIG. 4.

In yet a further embodiment in accord with this invention, the air inlet path of engine 10 (FIG. 1) may, in certain engine operating ranges, experience transient air pressure pulsations during which the direction of airflow through inlet manifold 16 may temporarily reverse. Such pulsations are generally known in the art to occur for a variety of engine applications, but are more common in unthrottled engine applications, such as that of FIG. 1, due to the absence of the damping provided by a throttle valve in the air inlet path.

When such pulsations occur, the accuracy of the airflow measurement provided by mass airflow meter 20 in accord with this invention may decrease. To avoid any potential inaccuracy in the closed-loop EGR control compensation in accord with the present invention under such conditions, the inventors intend that it is within the scope of this invention to take certain corrective actions. Such corrective actions may be applied under any conditions in which the mass airflow meter accuracy may be significantly questionable. Specifically, the following is an example of how such corrective actions may be applied to the described preferred embodiment of this invention.

Referring specifically to FIG. 2a, if engine parameters such as engine speed and desired fuel quantity indicate that the engine is operating at a level commonly observed to experience the described airflow reversals or other known conditions under which the mass airflow meter 20 (FIG. 1) may not be sufficiently accurate, steps 78, and 80 are not executed, and the BLMegr value referenced at the step 82 may be a neighboring block learn value in the block learn table having a magnitude greater than that value in the table pointed to by the engine speed and desired fuel quantity.

The referenced block learn value is required to be higher to reduce the EGR quantity admitted to the engine 10 (FIG. 1) and thus the engine performance impact when reliable mass airflow information is not present. If no neighboring block learn value is greater in magnitude, the block learn value pointed to by the engine speed and desired fuel quantity is referenced from the table.

Next, the steps 84 and 86 are not executed, as in the case in which the block learn is determined to not be stable at the step 83, and the step 88 is carried out using the block learn value referenced from the table and not updated during the present execution of the routine. The remaining steps of FIGS. 2a and 2b would not be affected by the airflow reversal condition. Through these generally described adjustments to the routine of FIGS. 2a and 2b, block learn updating is avoided, yet quasi-closed loop correction is provided under conditions in which the mass airflow measurement may not be highly accurate.

The preferred embodiment of the invention for the purpose of explaining the invention is not to be taken as limiting or restricting the invention since many modifications may be made through the exercise of skill in the art without departing from the scope of the invention.

The embodiments of the invention in which a property or privilege is claimed are described as follows:

1. A method for controlling recirculated engine exhaust gas in a diesel engine having a plurality of cylinders and an EGR valve responsive to an EGR command for metering the recirculated exhaust gas to an engine air intake so as to dilute air admitted to the cylinders to substantially maintain a beneficial air/fuel ratio in the cylinders, comprising the steps of:

generating a fuel command for an engine cylinder in accord with an operator fuel request;

determining a desired air inlet rate to the engine cylinder responsive to the fuel command as the air inlet rate estimated to provide the beneficial air/fuel ratio for the generated fuel command;

estimating actual air inlet rate to the cylinder;

generating air inlet rate error as the difference between the desired air inlet rate and the estimated actual air inlet rate;

determining an open-loop desired EGR quantity in response to the fuel command as an estimate of the quantity of recirculated engine exhaust gas needed to dilute air admitted to the engine cylinder to provide the beneficial air/fuel ratio;

sensing a predetermined set of engine parameters indicative of an engine operating level;

selecting an EGR gain value from a stored schedule of gain values as the one of the stored schedule of gains values corresponding to the sensed predetermined set of engine parameters;

determining an EGR gain adjustment value as a predetermined function of the air inlet rate error and of the open-loop desired EGR quantity;

varying the selected EGR gain value by the determined EGR gain adjustment value; and generating an EGR command as a predetermined function of the open-loop desired EGR quantity, the varied selected EGR gain value, and the air inlet rate error.

2. The method of claim 1, further comprising the steps of:

monitoring the predetermined set of engine parameters indicative of an engine operating level over a predetermined stability period;

determining whether the monitored set of engine parameters are substantially steady over the predetermined stability period; and wherein the step of determining an EGR gain adjustment value determines the EGR gain adjustment value to be zero, for no variation of the EGR gain value, when the monitored set of engine parameters are determined to not be substantially steady, and otherwise determines the EGR gain adjustment value as a predetermined function of the air inlet rate error and of the open-loop desired EGR quantity.

3. The method of claim 1, wherein the step of estimating actual air inlet rate to the cylinder further comprises the steps of:

sensing engine air inlet rate;
sensing engine speed; and
determining a ratio of sensed engine air inlet rate to sensed engine speed as an estimate of air inlet rate to the cylinder.

4. The method of claim 1, further comprising the steps of:

defining at least one engine operating range within which the estimate of cylinder air inlet rate from the estimating step can be substantially inaccurate;
sensing when the engine is operating in such a defined engine operating range; and
wherein the step of determining an EGR gain adjustment value determines the EGR gain adjustment value to be zero, for no variation of the EGR gain value, when the engine is sensed to be operating in such a defined engine operating range, and otherwise determines the EGR gain adjustment value as a predetermined function of the air inlet rate error and of the open-loop desired EGR quantity.

5. A method of controlling recirculation of a portion of exhaust gas emitted by a diesel engine having a plurality of cylinders and an EGR metering means actuated in accord with an EGR command for metering the portion of exhaust gas to an engine air intake, comprising the steps of:

storing a set of predetermined adaptive EGR gains, wherein each of the set corresponds to a predetermined one of a set of engine operating ranges;
determining a desired quantity of fuel to be injected to a cylinder in accord with an operator fuel request;
generating a desired engine cylinder air/fuel ratio;
determining a desired cylinder air inlet rate in accord with the determined desired quantity of fuel as the cylinder air inlet rate estimated to provide the desired engine cylinder air/fuel ratio;
sensing actual cylinder air inlet rate;
calculating cylinder air inlet rate error as the difference between the desired cylinder air inlet rate and the actual cylinder air inlet rate;
determining a target EGR value as an open-loop estimate of the EGR quantity needed to provide the desired cylinder air/fuel ratio in accord with the desired fuel quantity;
determining an EGR proportional adjustment by applying a predetermined proportional gain to the cylinder air inlet rate error;

sensing a predetermined set of engine parameters indicative of an engine operating level;
identifying an active one of the set of engine operating ranges as the engine operating range which includes the engine operating level indicated by the sensed predetermined set of engine parameters;
selecting an adaptive EGR gain as the one of the set of adaptive EGR gains corresponding to the active one of the set of engine operating ranges;
determining an integral EGR gain correction value as a predetermined proportion of a ratio of the EGR proportional adjustment to the target EGR value;
adjusting the selected adaptive EGR gain by the integral EGR gain correction value;
modifying the target EGR value in accord with the adjusted selected adaptive EGR gain; and
generating an EGR command by combining the EGR proportional adjustment with the modified target EGR value.

6. The method of claim 5, further comprising the steps of:

monitoring the predetermined set of engine parameters over a predetermined test period;
determining whether the monitored set of engine parameters are substantially constant in value over the predetermined test period; and
wherein the step of determining an integral EGR gain correction value determines the value to be zero when the monitored set of engine parameters are determined to not be substantially constant over the test period, and determines the value as a predetermined proportion of a ratio of the EGR proportional adjustment to the target EGR value when the monitored set of engine parameters are determined to be substantially constant over the test period.

7. The method of claim 5, further comprising the steps of:

defining at least one engine operating region within which the sensed actual cylinder air inlet rate can be substantially inaccurate;
sensing when the engine is operating in such a defined engine operating region; and
wherein the step of determining an integral EGR gain correction value determines the value to be zero when the engine is sensed as operating in such a defined engine operating region and determines the value as a predetermined proportion of a ratio of the tEGR proportional adjustment to the target EGR value when the engine is sensed to not be operating in such a defined engine operating region.

* * * * *